Jan. 4, 1927.　　　　　　　　　　　　　　　　　1,613,024
A. Y. DODGE
BRAKE OPERATING MECHANISM
Filed July 24, 1926　　　　2 Sheets-Sheet 1

INVENTOR
ADIEL Y. DODGE
BY
ATTORNEY

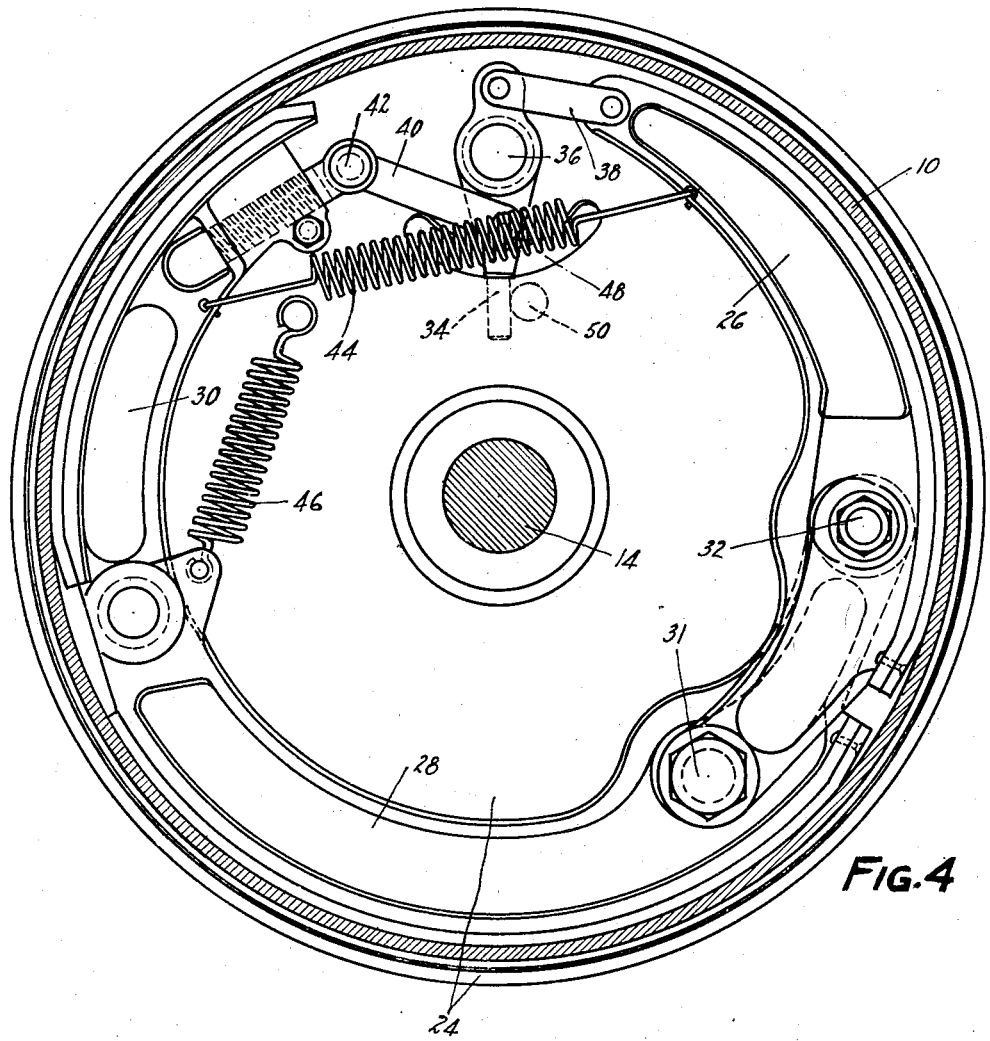
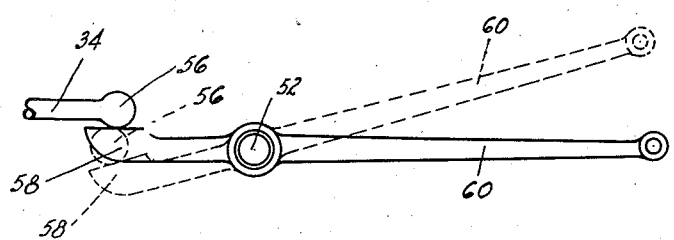
Fig. 5
INVENTOR
Adiel Y. Dodge

Patented Jan. 4, 1927.

1,613,024

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed July 24, 1926, Serial No. 124,555, and in Great Britain June 4, 1925.

This invention relates to brakes, and is illustrated as embodied in novel operating mechanism for a front wheel automobile brake. An object of the invention is to eliminate most of the direction-changing elements of the brake control, and thus simplify the control, by utilizing to apply the brake a simple horizontally-swinging lever, while at the same time so arranging and constructing the control that there are no limitations as to the kind of brake and axle which may be used.

In one desirable arrangement there are two levers, one being the above-described horizontal lever and the other being shown as a crank arm swivelling with the wheel, and forming part of the means for applying the brake. Preferably one lever terminates in a ball, or other part having an engaging surface curved in horizontal section, and arranged with its center when the brake is applied in or immediately adjacent the swivelling axis of the wheel.

The above and other objects and features of the invention, including a novel shoe-applying lever connection, and other novel combinations of parts and desirable particular constructions, will be apparent from the following description of the illustrative embodiments shown in the accompanying drawings, in which:

Figure 4 is a vertical section through the brake on the line 4—4 of Figure 1, showing the shoes in side elevation; and Figure 5 is a view corresponding to Figure 2, but showing a modification.

Figure 1:
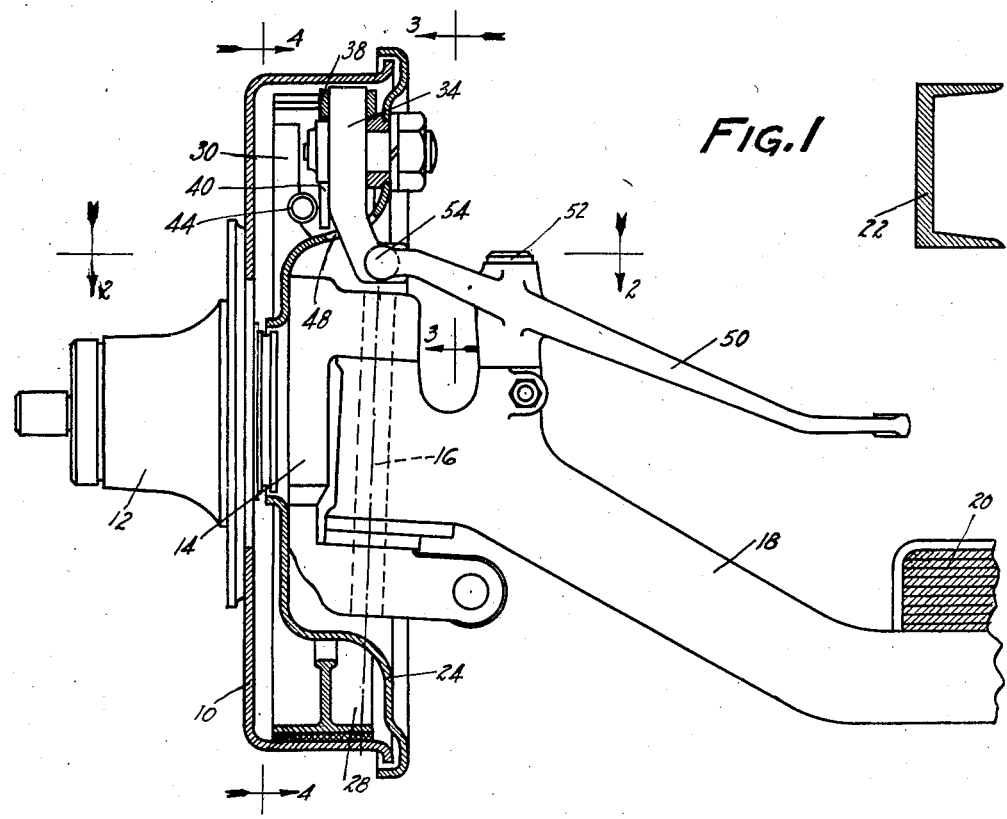
Figure 1 is a vertical section through the left front brake and associated parts, looking toward the front of the car.

The brake selected for illustration includes a drum 10 rotating with a wheel, the hub of which is shown at 12, carried by a knuckle 14 swivelled, by a king pin or other pivot member 16, at one end of an axle 18. Axle 18 and a rear axle (not shown) support, through the usual springs 20, a chassis frame 22. Knuckle 14 also carries a backing plate 24 closing the open side of the drum 10.

The brake proper includes shoes 26, 28, and 30, shoes 26 and 28 preferably being anchored on pivots 31 and 32 carried by plate 24, and shoe 30 being pivoted to the end of shoe 28. Pivot 31 passes through a relatively large opening in shoe 28, and pivot 32 passes through a relatively large opening in shoe 26, thus overlapping the shoes at their anchored ends. (See French Patent No. 600,167 as to the details of this construction.) The shoes are arranged to be forced against the drum by means such as a novel arm or lever 34 pivoted at 36 on plate 24, and connected above pivot 36 by one or more links 38 to the free end of shoe 26, and below pivot 36 by one or more links 40 to an adjustable eye-bolt 42 threaded in the end of shoe 30. Rocking arm 34 pries shoes 26 and 30 apart against the resistance of a return spring 44 to apply the brake, whereupon shoe 30 applies shoe 28 against the resistance of an auxiliary return spring 46.

Figure 2:
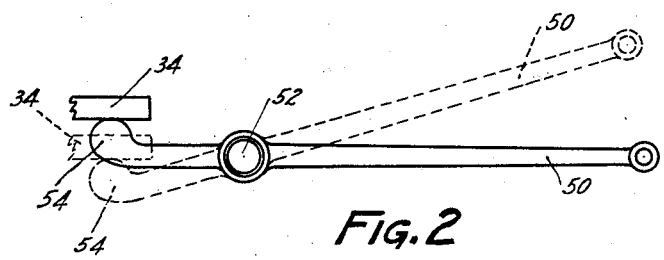
Figure 2 is a partial horizontal section on the line 2—2 of Figure 1, showing the two levers.

Lever or crank arm 34 extends through an arcuate slot 48 in the backing plate 24, and in the arrangement of Figures 1 and 2 and in the lower part of Figure 4 is shown terminating in a flat or plane end which is moved forwardly in applying the brake.

Lever 34 is operated by a second or horizontal lever 50, shown as being fulcrumed between its ends on axle 18 at 52, and having an integral ball end 54 engaging the plane end of lever or arm 34 (Figure 2). When the brake is applied, the left-hand end of lever 50 is thus above and in line with a part of pivot member 16, in such a manner that the center of ball 54 is substantially in the axis of the pivot member, while the right-hand end of lever 50 is adjacent the edge of chassis frame 22, where it is not in the way of any of the parts which are moved in swivelling the wheel in steering, as might be the case if the brake rods were connected to some part at the extreme end of the axle. Preferably the end of lever 50 is below and approximately in line with the edge of frame 22. It will also be noted that the axis of pivot member 16 does not pass through the brake rim midway between its edges, and in fact need not intersect the brake at all, as the lever or crank arm 34 serves to carry the brake-applying force from the swivelling axis to the brake. This makes it possible to use an axle of any desired type.

Figure 3:
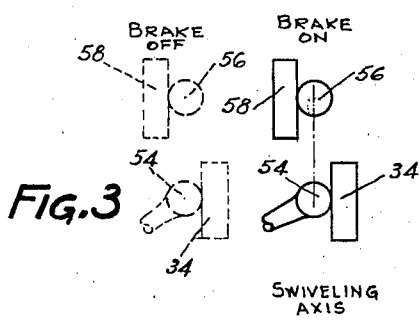
Figure 3 is a diagram representing a section on the line 3—3 of Figure 1.

In applying the brake, the parts are moved from the dotted-line position to the full-line position in Figure 2 and in the lower half of Figure 3. It will be seen that such movement causes the center of ball 54 to move from an idle position, in which its center is spaced some distance behind the swivelling axis of the wheel, forwardly to an active position in which its center is substantially in that axis.

In Figure 5, and in the upper half of the diagram of Figure 3, is shown a modification in which the lower end of lever or crank arm 34 has a ball end 56, or an equivalent part having a circularly-arcuate surface in horizontal section, engaging a flat or vertically plane thrust surface on a head 58 on the outer end of a lever 60 which is otherwise the same as lever 50. The center of ball 56 is substantially in the swivelling axis when the brake is applied, the parts moving in applying the brake from dotted-line position to full-line position in Figure 5 and in the upper half of Figure 3.

In the second arrangement, if the wheel is turned while the brake is applied, ball 54 merely turns idly on the flat surface on the end of lever 60, which is tangent to it, and being of circular outline the position of lever 34 is not affected and there is substantially no effect on the brake and no interference with the swivelling of the wheel. In the first arrangement, if the wheel is swivelled while the brake is applied, the end of lever 34 merely rolls idly around on ball 54, to which it is tangent, without affecting the brake or the swivelling of the wheel.

The present application is in part a continuation of my prior applications Nos. 742,997, filed October 11, 1924, 51,937, filed August 24, 1925, and 85,946, filed February 4, 1926.

While the illustrated constructions have been described in detail, it is not my intention to limit the scope of the invention to those particular constructions, or otherwise than by the terms of the appended claims.

I claim:

1. A wheel assembly comprising, in combination, a wheel mounted for swivelling movement, retarding means for the wheel, a pivoted arm arranged to operate the retarding means, and a lever engaging and operating said arm, the point of engagement moving generally at right angles toward the swivelling axis in applying the brake.

2. A wheel assembly comprising, in combination, a wheel mounted for swivelling movement, retarding means for the wheel, a pivoted arm arranged to operate the retarding means, and operating means engaging and operating said arm, the point of engagement moving parallel to the wheel generally at right angles toward the swivelling axis to active position.

3. A wheel assembly comprising, in combination, a wheel having a brake and mounted for swivelling movement, the wheel and swivelling axis being relatively inclined so that the axis does not pass through the brake rim midway between its edges, an operating member mounted for movement in a plane generally perpendicular to the swivelling axis and having a part movable from an idle position spaced from the swivelling axis to an active position substantially in that axis, and means at the upper part of the brake and extending downwardly and inwardly toward that axis and engaged by said part and operated by the member to apply the brake.

4. Operating means for a brake on a swivelled wheel comprising, in combination, a first lever swivelling with the wheel and arranged to apply the brake, and a second lever fulcrumed for movement about an axis generally paralleling the swivelling axis but spaced therefrom, the second lever having a part operatively acting on a part of the first lever, said parts being so arranged when the brake is applied that swivelling the wheel moves the one about the other substantially about the swivelling axis of the wheel.

5. Operating means for a brake on a swivelled wheel comprising, in combination, a first lever swivelling with the wheel and arranged to apply the brake, and a second lever fulcrumed for movement about an axis generally paralleling the swivelling axis but spaced therefrom, the second lever having a part operatively acting on a part of the first lever, one of said parts having its engaging surface curving in horizontal section when the brake is applied substantially about the swivelling axis of the wheel.

6. Operating mechanism for a brake on a wheel mounted for swivelling movement about a vertically-extending pivot, and comprising, in combination with said parts, two operatively-connected levers, one swivelling with the wheel and operating the brake, and the other fulcrumed for movement about an axis generally parallel to said pivot, the operatively connected ends of the levers being arranged when the brake is applied substantially in line with said pivot.

7. Operating mechanism for a brake on a wheel mounted for swivelling movement about a vertically-extending pivot, and comprising, in combination with said parts, two operatively-connected levers, one swivelling with the wheel and operating the brake and swinging in a direction parallel to the wheel plane, and the other fulcrumed for movement about an axis generally parallel to said pivot, the operatively connected ends of the levers being arranged when the brake is applied above and substantially in line with said pivot.

8. Operating mechanism for a brake on a wheel rotataby mounted and arranged at one end of an axle for swivelling movement about a vertically-extending pivot connected to the axle, and comprising, in combination with said parts, a lever fulcrumed on the axle for movement about an axis generally paralleling said pivot to swing its end horizontally toward and from a position in line with said pivot, and a brake-applying lever swivelling with the wheel and operated by the first lever.

9. Operating mechanism for a brake on a wheel rotatably mounted and arranged for swivelling movement about a vertically-extending pivot, and comprising, in combination with said parts, a lever fulcrumed for movement about an axis generally paralleling said pivot to swing its end horizontally toward and from a position in line with said pivot, and a brake-applying lever swivelling with the wheel and having its end operatively engaged by said end of the first lever.

10. Operating mechanism for a brake on a swivelled wheel comprising, in combination, two operatively engaging levers, one swivelling with the wheel and operating the brake, the engaging part of one of said levers being a part of circular horizontal outline tangent to the other lever and movable from a position with its center spaced materially from the swivelling axis toward that axis in applying the brakes.

11. Operating mechanism for a brake on a swivelled wheel comprising, in combination, two operatively engaging levers, one swivelling with the wheel and operating the brake, the engaging part of one of said levers being a part of circular horizontal outline movable from a position with its center spaced materially from the swivelling axis toward that axis in applying the brake, the non-swivelling lever being fulcrumed for movement about an axis substantially paralleling the swivelling axis of the wheel.

12. Operating mechanism for a brake on a swivelled wheel comprising, in combination, two levers, one of which swivels with the wheel and applies the brake, and one having a generally flat portion and the other having an integral ball engaging said portion, the center of said ball moving in applying the brake in an arc approximately intersecting the swivelling axis of the wheel.

13. Operating mechanism for a brake on a swivelled wheel comprising, in combination, two levers, one of which swivels with the wheel and applies the brake, and one having a generally flat portion and the other having an integral ball engaging said portion, the center of said ball moving in applying the brake from an idle position spaced materially from the swivelling axis of the wheel to an active position substantially in that axis.

14. Operating mechanism for a brake on a swivelled wheel comprising, in combination, two levers, one of which swivels with the wheel and applies the brake, and one having a generally flat portion and the other having an integral ball engaging said portion, the center of said ball moving in applying the brake crosswise of the swivelling axis of the wheel, the non-swivelling lever being fulcrumed for generally horizontal movement about an axis substantially paralleling the swivelling axis of the wheel.

15. Operating mechanism for a brake on a swivelled wheel comprising, in combination, a vertically-extending brake-applying lever swivelling with the wheel, and a horizontally-extending lever generally perpendicular to the wheel plane and operating the brake-applying lever, one lever having a ball portion engaging the other lever and having its center substantially in the swivelling axis of the wheel when the brake is applied.

16. Operating mechanism for a brake on a swivelled wheel comprising, in combination, a vertically-extending brake-applying lever swivelling with the wheel and a horizontally-extending lever having a ball portion engaging the brake-applying lever and having its center substantially in the swivelling axis of the wheel when the brake is applied.

17. Operating mechanism for a brake on a vehicle wheel comprising, in combination, a vertically-extending brake-applying lever, and a horizontally-extending lever generally perpendicular to the wheel plane and operating the brake-applying lever, the one lever having a ball portion engaging the other lever.

18. Operating mechanism for a brake on a vehicle wheel comprising, in combination, a vertically-extending brake-applying lever, and a horizontally-extending lever having a ball portion engaging the brake-applying lever.

19. Operating mechanism for a brake on a swivelled wheel movable about a pivot member and forming part of a chassis including a yieldingly supported frame, and comprising, in combination, a pair of levers, one applying the brake and swivelling with the wheel, and the other operating the brake-applying lever and having its ends arranged, when the brake is applied, respectively in line with the pivot member and adjacent the edge of the chassis frame.

20. Operating mechanism for a brake on a swivelled wheel movable about a pivot member and forming part of a chassis including a yieldingly supported frame, and comprising, in combination, a pair of levers, one applying the brake and swivelling with the wheel, and the other operating the brake-applying lever and having its ends arranged, when the brake is applied, respectively in line with the pivot member and adjacent the edge of the chassis frame, and fulcrumed for movement about an axis between the chassis frame and the swivelling axis of the wheel.

21. Operating mechanism for a brake on a swivelled wheel movable about a pivot member connected to one end of an axle, and forming part of a chassis including a yieldingly supported frame, and comprising, in combination, a pair of levers, one applying the brake and swivelling with the wheel, and the other operatively acting on the first lever at its outer end and fulcrumed on the axle for movement about an axis between the chassis frame and the swivelling axis of the wheel and having its ends arranged, when the brake is applied, respectively in line with the pivot pin and adjacent the edge of the chassis frame.

In testimony whereof, I have hereunto signed my name.

ADIEL Y. DODGE.